(12) United States Patent
Draper et al.

(10) Patent No.: US 9,020,937 B2
(45) Date of Patent: Apr. 28, 2015

(54) PERSONAL GREETING/INFORMATION/ADVERTISING SYSTEM AND METHOD

(76) Inventors: Trenton Draper, Powder Springs, GA (US); Kerry Washington, Decatur, GA (US)

( * ) Notice: Subject to any disclaimer, the term of this patent is extended or adjusted under 35 U.S.C. 154(b) by 789 days.

(21) Appl. No.: 11/998,494

(22) Filed: Dec. 1, 2007

(65) Prior Publication Data
US 2009/0144330 A1    Jun. 4, 2009

(51) Int. Cl.
*G06F 17/30* (2006.01)
*G06Q 30/02* (2012.01)
*G06Q 10/10* (2012.01)

(52) U.S. Cl.
CPC .............. *G06Q 30/02* (2013.01); *G06Q 10/107* (2013.01)

(58) Field of Classification Search
USPC .................................................... 707/999.107
See application file for complete search history.

(56) References Cited

U.S. PATENT DOCUMENTS

| | | | |
|---|---|---|---|
| 6,676,272 B2 | 1/2004 | Chance | |
| 6,976,032 B1 * | 12/2005 | Hull et al. ............................. | 1/1 |
| 7,788,136 B2 * | 8/2010 | Diaz Perez ................... | 705/27.1 |
| 2003/0149576 A1 * | 8/2003 | Sunyich ............................ | 705/1 |
| 2004/0059815 A1 * | 3/2004 | Buckingham et al. ......... | 709/224 |
| 2004/0107169 A1 * | 6/2004 | Lowe .............................. | 705/59 |
| 2004/0143841 A1 * | 7/2004 | Wang et al. ..................... | 725/32 |
| 2005/0144642 A1 * | 6/2005 | Ratterman ....................... | 725/78 |
| 2005/0154736 A1 * | 7/2005 | Meikleham et al. ........... | 707/10 |
| 2005/0185918 A1 * | 8/2005 | Lowe .............................. | 386/46 |
| 2007/0038727 A1 * | 2/2007 | Bailey et al. .................. | 709/219 |
| 2007/0050197 A1 * | 3/2007 | Efron et al. ....................... | 705/1 |
| 2007/0101004 A1 * | 5/2007 | Loen ............................. | 709/227 |
| 2007/0126576 A1 * | 6/2007 | Script et al. ................ | 340/545.5 |
| 2007/0226019 A1 * | 9/2007 | Carlson et al. .................... | 705/5 |
| 2008/0048880 A1 * | 2/2008 | Strickland et al. .......... | 340/815.4 |
| 2008/0155429 A1 * | 6/2008 | Frank et al. .................... | 715/751 |
| 2009/0115604 A1 * | 5/2009 | Thomas et al. ............... | 340/540 |

* cited by examiner

*Primary Examiner* — Kevin L Young
(74) *Attorney, Agent, or Firm* — Elizabeth Waiguchu

(57) ABSTRACT

A method and system is disclosed for providing a particular greeting (35), preferred customized advertisement (39) and preferred customized message (37) that is personalized to a particular hotel/resort guest. The greeting (35), advertisement (37) and message (39) are delivered via a service terminal unit (50) located inside a guest room. An introduction message including a personalized greeting (35) for the particular guest at a particular period and addressing the guest by their name plays first via the service terminal unit (50) located in the guest room. After the introduction, messages (39), and personalized information containing advertisements (37) including activities, sites, special events, and services that are customized and preferred by the particular hotel/resort guest play via the service terminal unit (50).

12 Claims, 7 Drawing Sheets

| Menu A: MAIN MENU | |
|---|---|
| • Hotel Services & Events | • Shopping |
| • Restaurants | • Sporting Activities & Events |
| • Consumer Product Stores | • Transportation |

| Menu B: HOTEL/RESORT SERVICES & EVENTS | |
|---|---|
| • Restaurants | • Workout Facilities |
| • Gift Shops | • Special Events |

| Menu C: RESTAURANTS | | |
|---|---|---|
| • American Food | • Delivery Food | • Mediterranean Food |
| • Asian Food | • Fast Food | • Mexican Food |
| • Bakeries | • Indian Food | • Natural/Whole Foods |
| • Caribbean Food | • Italian Food | • Sea Food |
| • Coffee Shops | • Juice Bars | • Vegetarian Food |

| Menu D: CONSUMER PRODUCTS | | |
|---|---|---|
| • Auto Parts Stores | • Flower Stores | • Music Stores |
| • Boating Supply | • Furniture Stores | • Office Supply |
| • Book Stores | • Grocery Stores | • Pet Stores |
| • Departmental Stores | • Hardware Stores | • Specialty Items |
| • Drug Stores | • Home Improvement | • Video Rental |

| Menu E: SHOPPING / THEATERS | | |
|---|---|---|
| • Antiques | • Boat Stores | • Show Theaters |
| • Auctions | • Computers | • Shopping Malls |
| • Automobiles | • Discount Stores | • Up Scale Stores |
| • Average Priced Stores | • Movie Theaters | • Specialty Shopping |

| Menu F: SPORTING EVENTS | | | |
|---|---|---|---|
| • Golf Facilities | • Hockey | • Cycling | • Motor Sports |
| • Basketball | • Skating | • Darts | • Paintball |
| • Tennis | • Running | • Fencing | • Racquetball |
| • Football | • Soccer | • Fishing | • Gymnastics |
| • Special Events | • Archery | • Hiking | • Shooting |
| • Greyhound Racing | • Baseball | • Rodeo | • Swimming |
| • Horse Racing | • Boxing | • Skating | • Softball |
| • Cheerleading | • Bowling | • Hunting | • Track |
| • Indoor Games | • Cricket | • Lacrosse | • Volleyball |
| | • Croquet | • Martial Arts | • Wrestling |

| Menu G: TRANSPORTATION | | |
|---|---|---|
| • Taxis | • Buses Subways | • Car Pools |
| • Limousine Service | • Trains | • Cruises |
| • Car Rental | • Shuttles | • Transportation Options |

FIG. 4

PERSONAL GREETING/INFORMATION/ADVERTISING SYSTEM AND METHOD

TECHNICAL FIELD

This invention relates to computerized advertisements and message systems, specifically to an improved personalized, preferred and customized greeting and message system for a hotel and resort guest.

BACKGROUND OF THE INVENTION

Currently, advertising to hotel and resort guests is complicated by availability of several radio stations, a plethora of magazines catering to each special interest, a world wide web of infinitely expanding websites. Additionally, hotel and resort guests are flooded with advertisements making it harder to reach such guests and convince them to buy one product over another.

Studies done by various people have useful insights of why customers buy one product over another. Studies have shown that shopping means different things to different people. People buy products for many different reasons such as a form of therapy, to pass time, as a reward, bribery, entertainment or even as a way to troll for loved ones. Knowing the particular needs of a customer in a particular period is beneficial to ensure that the customer advertisement and message is noted and received by the customer.

In the present invention, information that is customized for a particular guest is provided by merely opening a guest room door. As a result, in this present invention, the customer can readily and conveniently access the provider of the customized services without needless waste of time.

In the present invention, the advertisements are customized to take into account the particular customer's name, special personal needs and personal interests for the particular period. Additionally, the advertisements/message are specifically targeted for a particular customer at a particular period.

In the present invention the service terminal records data on a hard disc inside the service apparatus unit. In this invention, a customer without any prior transactional history is able to receive customized preferred services.

Further, since some hotel/resort guests rarely spend time in the same hotel frequently it is difficult to establish buying habits for such guests. In the present invention, the personal greeting information device will not require prior sale transactions in order to provide the customer with the preferred choices of services.

The present invention provides Personalized message and greeting system with information including local consumer businesses that of interest to the customer, and activities that are of interest to the customer.

SUMMARY

In accordance with the present invention a method and system is disclosed for providing a particular greeting and message that is personalized to a particular hotel or resort guest. The greeting and message is delivered to the hotel or resort via a service terminal unit located inside the guest room. Following an introduction, a personalized message containing advertisements, activities, sites, special events, and services of guest preferences that are customized and preferred by the particular hotel or resort guest play via the service terminal unit. The message includes a personalized greeting for the particular guest at a particular period and addresses the guest by their name at a particular period. The message informs the particular guest of other personalized and preferred services that are provided by various businesses.

DESCRIPTION OF DIAGRAMS

To facilitate a complete understanding of the invention, a glossary of terms and acronyms is included.

A guest room/suite is an enclosed space for the use of a particular type of a customer such a hotel or resort guest.

The service-terminal unit is a device located inside the guest room/suite. The service-terminal unit delivers a particular greeting, a particular advertisement and a particular message that are customized and personalized for the particular guest occupying a specific guest room/suite.

The service-apparatus unit is a device located in the hotel or resort facility office. The service-apparatus unit sends by electronic means a particular greeting, a particular advertisement and a particular message to the service-terminal unit.

The door sensor is a device connected to the guest room or suite and is activated when the guest room/suite door is opened. Once the door sensor is activated, the service-terminal unit provides audio, video-graphic or written information particularly specific for the guest.

Guest preference data is information that includes the guest's own preferred and selected advertisements, messages and greetings.

The customized and preferred greeting is a message of good will carefully and particularly crafted for a particular guest at a particular hotel or resort at a particular time period. The greeting includes audio format, video-graphic format, or written format.

Customized and preferred message is a message that a guest particularly desires which includes special interests, and hobbies.

Customized and preferred advertising information includes advertisements from various sources that a particular hotel or resort guest particularly desires at a particular place and time. The advertisement information is researched, collected, and stored in a database before a customer enters into their hotel or resort room. The advertisement includes information previously collected from various sources such as from the customer, and various sources.

Other personalized information messages include special information that a particular guest requests including personal appointment reminders, other reminders, wake up calls, maps, directions, weather, billings, date or time.

Software e-packages are electronic modules each composed of software files that work together to accomplish one or more tasks in a computer system.

Facility floor level is a certain floor within a multi-floor building such as a tower.

Facility office is a Hotel/resort business office that contains the Service Apparatus Unit computer system.

Network hub is a unit within the local area network system that receives electronic signals from a transmitting unit and distributes the signal to the designated receiver.

FIGS. 1a and 1b illustrating how information in the present invention is transmitted to a guest in a hotel room or resort facility.

FIG. 4 is a preferred embodiment diagram illustrating selection from a menu of services and information displayed on the screen that are available for a hotel or resort guest.

DETAILED DESCRIPTION

FIG. 1 Preferred Embodiment

Figure 1A:
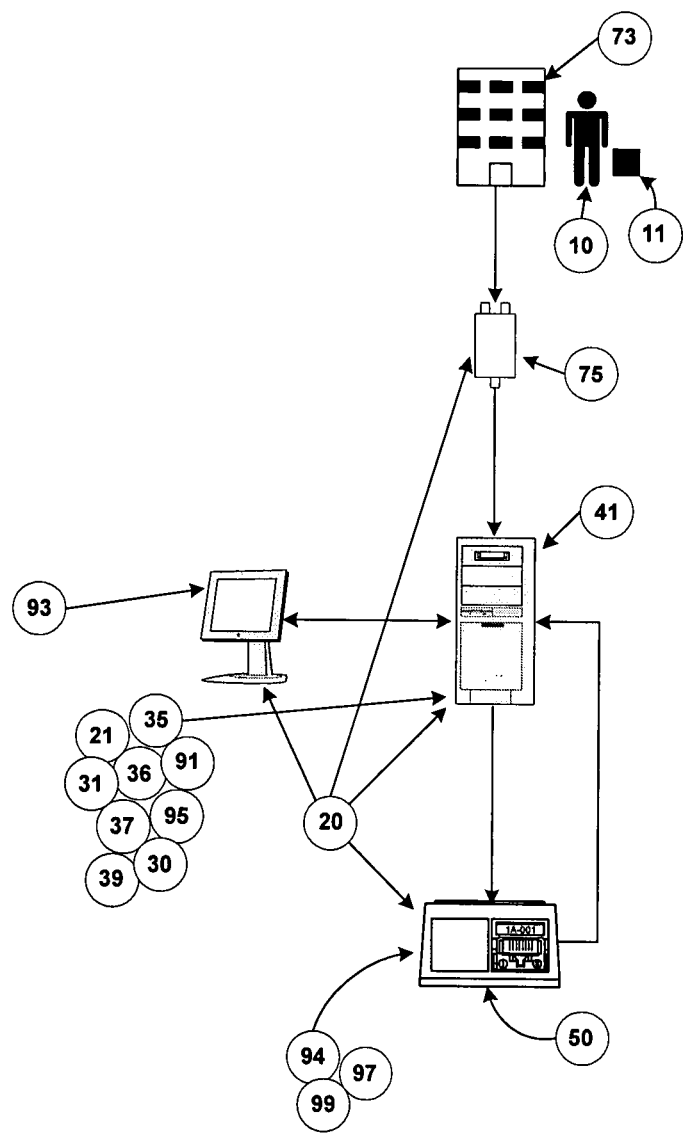

With reference to FIG. 1a, a preferred embodiment for a system 20 for providing a customized and preferred greeting 35, a customized and preferred message 39, and a customized and preferred advertising information 37 for a particular hotel/resort guest is illustrated. The system 20 includes an administrator interface unit 93 providing the graphic user interface tool 95 to input and edit customer information 30. The service-apparatus unit 41 includes the software 21 and database tools 91 that prepare and store the guest 10 personalized greeting 35, personalized advertisement 37, and other personalized information message 39 based on a guest 10 preference data information 31.

When a guest 10 opens their particular assigned guest room door/suite 73 the door sensor 75 sends a signal to the service-apparatus unit 41. The service-apparatus unit 41 initiates a personalized audio greeting 35, advertisement 37 and information message 39. The service-apparatus unit 41 sends the personalized audio greeting 35, advertisement 37 and information message 39 to the service-terminal unit 50 in the guest room suite 73. The service-apparatus unit 41 is capable of providing other information 36 requested by the guest 10. The service-terminal unit 50 has an audio and graphic user interface 95 to deliver the greeting 35, other information requested by the guest 36, advertisement 37, information message 39 and other information 36 requested by the guest 10. The terminal-unit 50, also provides user access through input buttons 97 and an audio transmitter 99 for information service request as well as interface ports 94 for downloads to the guest 10 personal apparatus 11 such as PDA'S, laptops, and faxes.

Figure 1B:
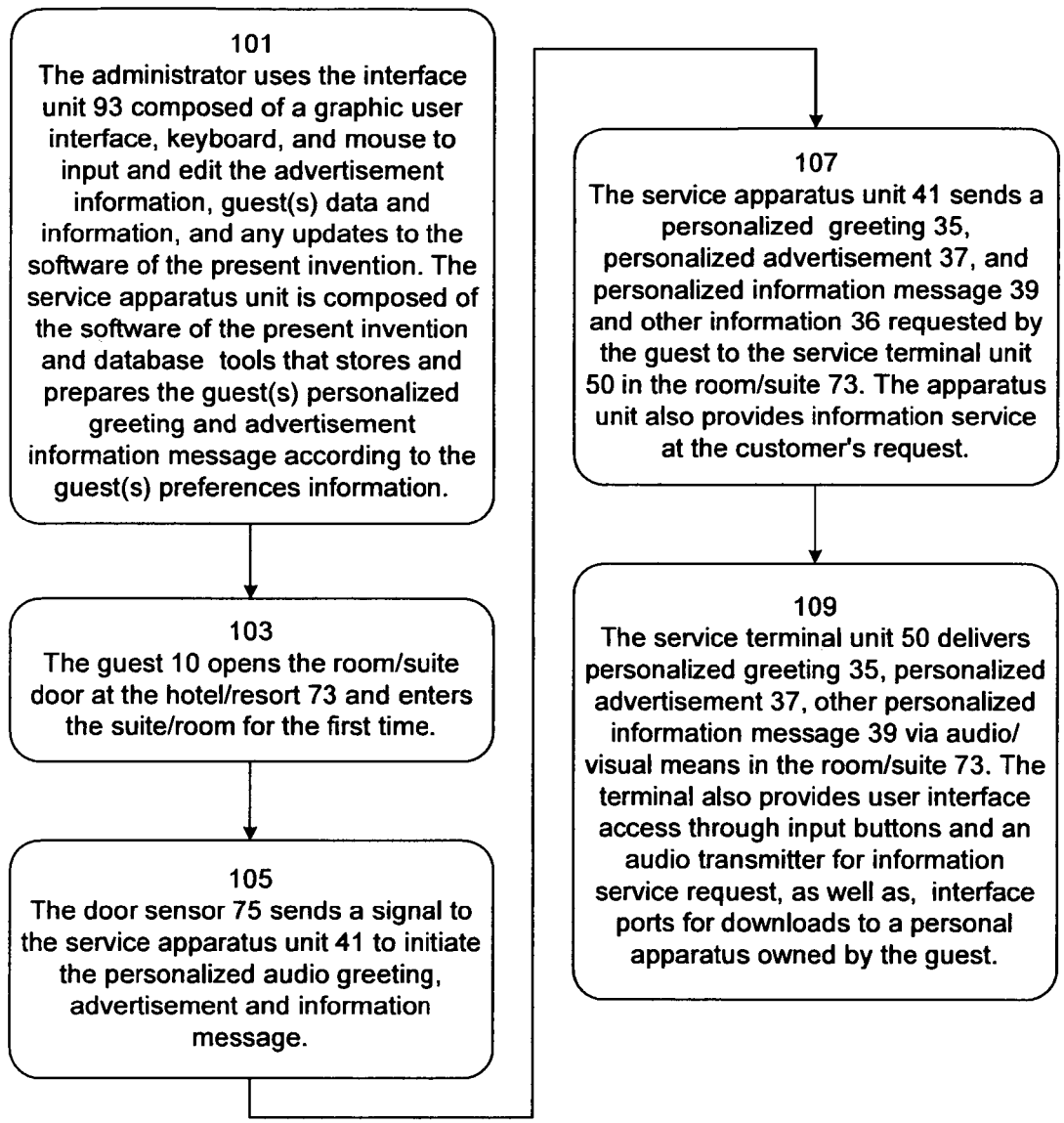

FIG. 1b illustrates information 101 transmitted 103,105, 107 and finally delivered 109 to the correct guest.

Figure 2:
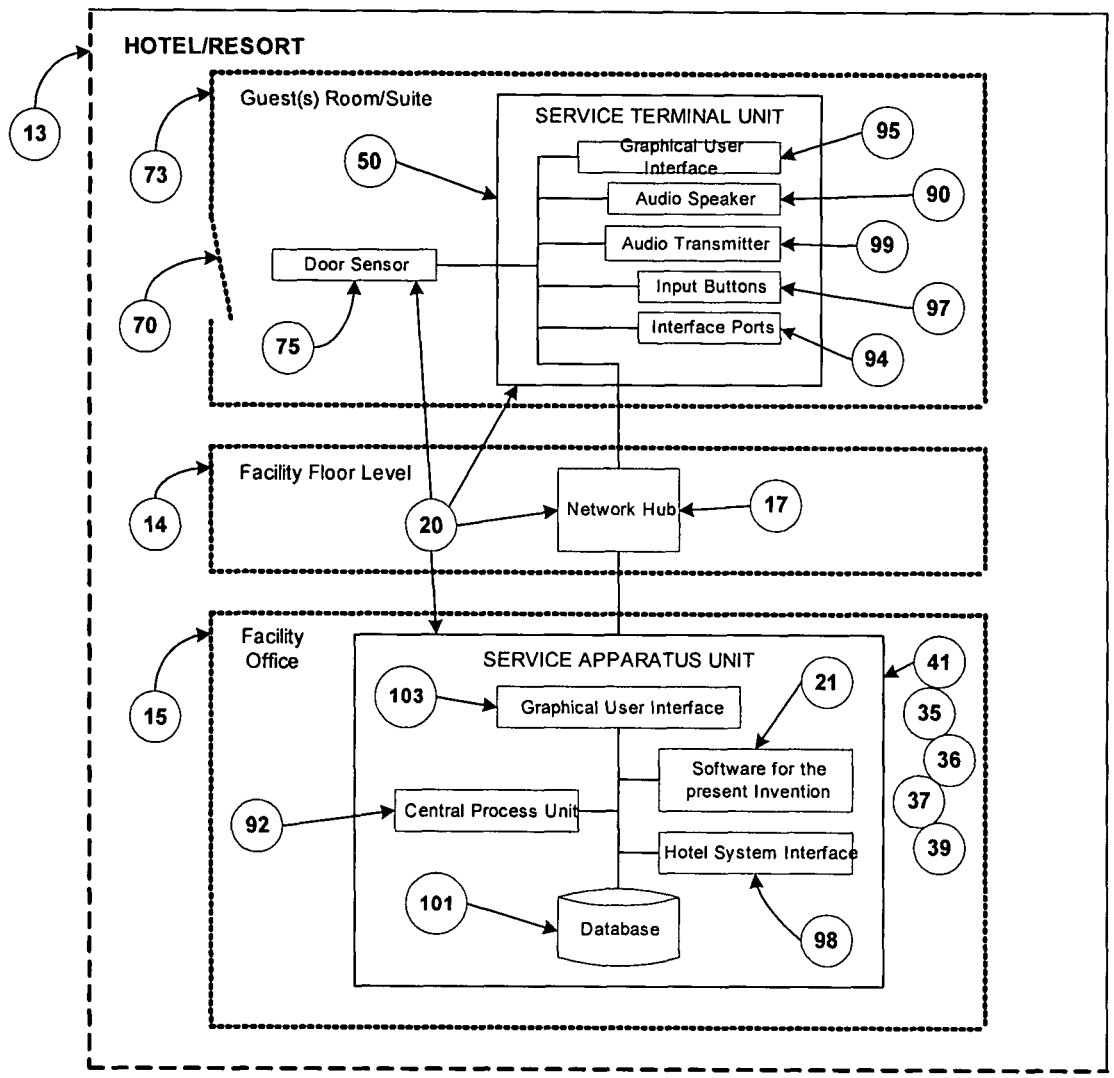
FIG. 2 is a diagram of a preferred embodiment of the present invention illustrating the location of software and various equipments for the present invention at the hotel or resort.

FIG. 2—Preferred Embodiment

FIG. 2 is a diagram of a preferred embodiment of the present invention 20 illustrating the location of the present invention in relation to other apparatus at the hotel/resort 13. To understand how the system 20 works in relation to other apparatus in the hotel/resort 13, a guest room/suite 73 with a door sensor 75, facility floor level 14, and facility office 15 are shown and described.

The service-apparatus unit 41 includes a graphic user interface 103, a central processing unit 92, hotel system interface 98, database software e-packages 101 and the program software for the present invention 21. The facility floor level 14 includes a network hub 17. The guest room/suite 73 includes a door sensor 75, and a service terminal-unit 50. The service-terminal unit 50 further includes a graphic user interface tool 95, an audio speaker 90, audio transmitter 99, input buttons 97, and interface ports 94.

When the guest room suite door 70 is opened, a door sensor 75 is activated. Greetings 35, Messages 39, advertisements 37 and other guest information 36 specific for the particular guest 10 play via the service-terminal unit 50. The guest 10 may request advertisements 37, messages 39 and other guest information 36 to be played more than once.

Figure 3:
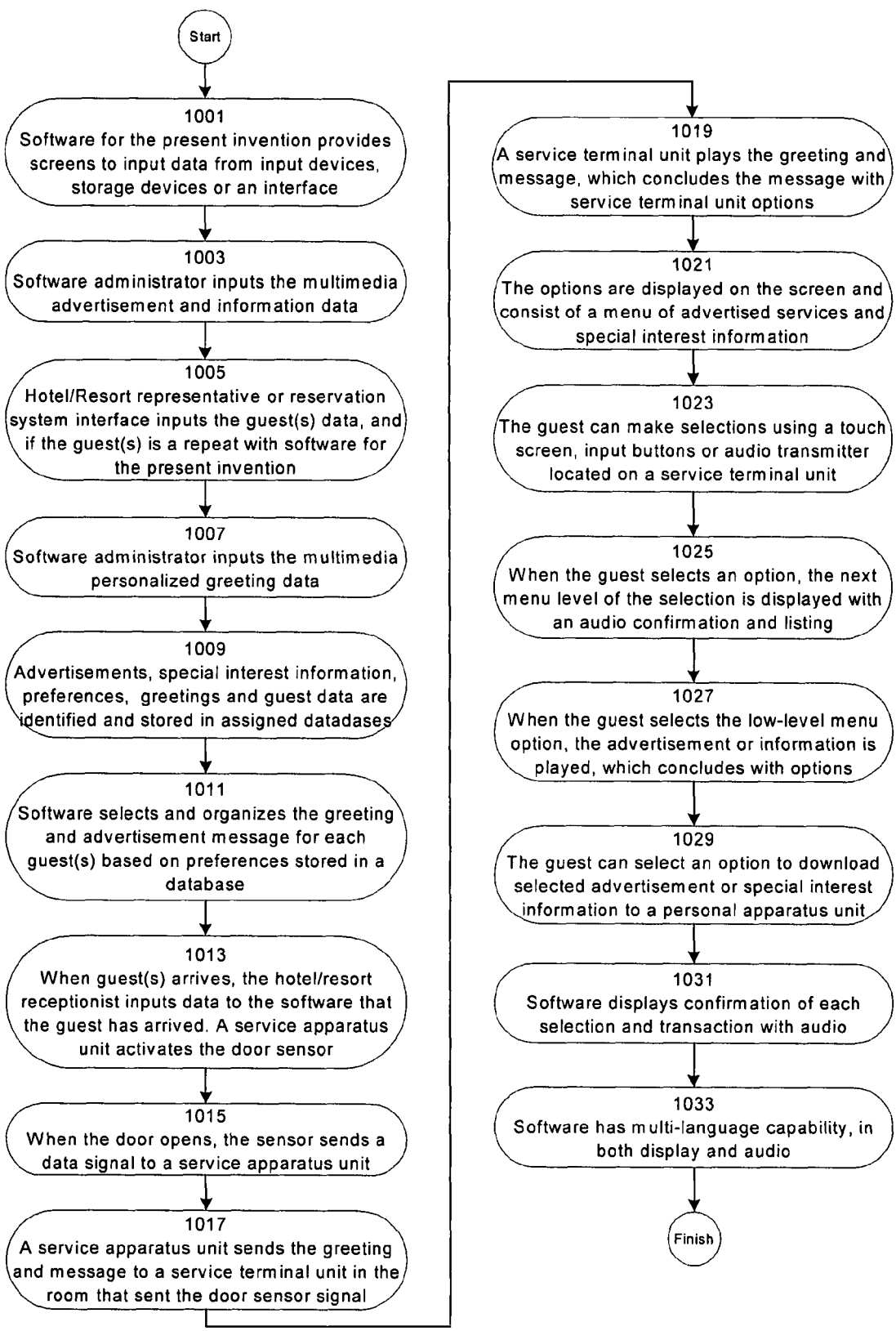
FIG. 3 is a preferred embodiment flow diagram illustrating steps involved in providing a greeting, information and advertisements specific for the particular guest via a service-terminal unit.

FIG. 3—Preferred Embodiment

FIG. 3 is a flow diagram of the steps involved in providing Messages 39, greetings 35, other guest information 36 and advertisements 37 specific for the particular guest via the service-terminal unit 50.

FIG. 4—Preferred Embodiment

FIG. 4 is detailed description of a user menu data for the preferred embodiment of the system 20 for the present invention. The menu A includes listings of preferred hotel services 105 and events 107, listing of preferred restaurants 109, listings of preferred consumer product stores 111, listings of preferred shopping activities 113, listing of preferred sporting activities and events 115, and listings of preferred transportation services 117. The menu B includes a listing of preferred hotel/resort Services and Events 119, which are a listing of restaurants 121, a listing of gift shops 123, a listing of workout facilities 124, and a listing of other events of interest specific to a guest 125.

If the guest 10 selects a listing on menu C, the guest 10 is provided with a listing of preferred choices. The listing of Restaurants 109 is further divided based on preferences 110. The preferences 110 includes American food restaurants 110a, Asian food restaurants 110b, bakeries 110c, Caribbean food restaurants 110d, coffee shops 110e, delivery food restaurants 110f, fast food restaurants 110g, Indian food restaurants 110h, Italian food restaurants 110i, juice bars 110j, Mediterranean food restaurants 110k, Mexican food restaurants 110m, natural/whole foods 110n, Sea Food restaurants 110p, vegetarian food restaurants 110q, and other miscellaneous specialties 110r.

If the guest 10 selects a listing on menu D of preferred Consumer Product Stores 111, the guest 10 is provided with a listing of preferred choices 112. The preferences 112 include auto parts stores 112a, boating supply stores 112b, book stores 112c, grocery stores 112d, departmental stores 112e, drug stores 112f, flower stores 112g, furniture stores 112h, hardware stores 112i, home improvement stores 112j, music stores 112k, office supply stores 112m, pet stores 112n, specialty items stores 112p, video rental stores 112q, other miscellaneous stores 112r.

If a guest 10 selects a listing on menu E of preferred shopping activities 113, the guest 10 is provided with a listing of preferred choices for shopping 114. The listing includes a shopping listing for guest interested in antiques 114a, auctions 114b, automobiles 114c, average priced stores 114d, boat stores 114e, computers 114f, discount stores 114g, movie theaters 114h, show theaters 114i, shopping malls 114j, up scale stores 114k, and a miscellaneous listing for guest interested in other specialty shopping activities.

A guest selecting a listing on menu F of preferred listing of preferred sporting activities and events 115 is provided with a listing of preferred choices 116. The preferences include a listing for Golf Facilities 211, a listing for basketball events 213, a listing for tennis events 214, a listing for running events 215, a listing for hiking events 216, a listing for swimming events 217, a listing for bowling events 218, a listing for in door games 219, a listing for hockey events 220, a listing for skating events 221, a listing for a listing for other special events 222, a listing for soccer events 223, a listing for archery Events 224, a listing for baseball events 225, a listing for boxing events 226, a listing for cheerleading events 227, a listing for cricket events 228, a listing for croquet events 229, a listing for cycling events a listing for darts events 230, a listing for fencing events 231, a listing for fishing events 232, a listing for greyhound racing events 233, a listing for gymnastics events 234, a listing for horse racing events 235, a listing for hunting events, a listing for lacrosse events 236, a listing for martial arts events 237, a listing for motor sports events 238, a listing for paintball events 239, a listing for racquetball events 240, a listing for rodeo events 241, a listing for shooting events 242, a listing for skating events 243, a listing for softball events 244, a listing for track events 245, a listing for volleyball events 246, a listing for wrestling events 247, a listing for football events 247.

A guest selecting a listing on menu level B of listings preferred transportation services 117 is provided with a listing of preferred choices 118. The preferences include Taxis 118*a*, Limousine Service 118*b*, Car Rental 118*c*, Buses 118*d*, Subways 118*e*, Trains 118*f*, Shuttles 118*g*, car pools 118*f*, Cruises 118*h*, other transportation options 118*g*.

Figure 5:
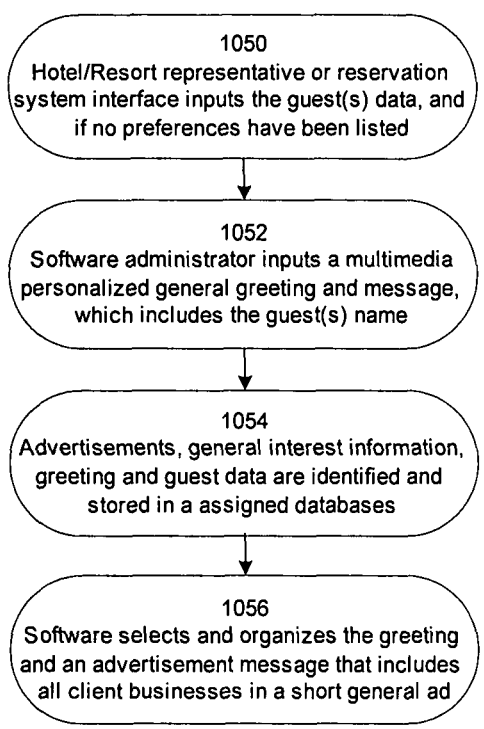
FIG. 5 is a description of an alternate embodiment of the present invention whereby a general greeting, a general message and a general advertisement is provided where no preference data for a particular guest is available.

FIG. 5—Alternative Embodiment

FIG. 5 is a description of an alternate embodiment of the present invention whereby a general greeting, a general message and a general advertisement is provided where no preference data for a particular guest is available.

Figure 6:
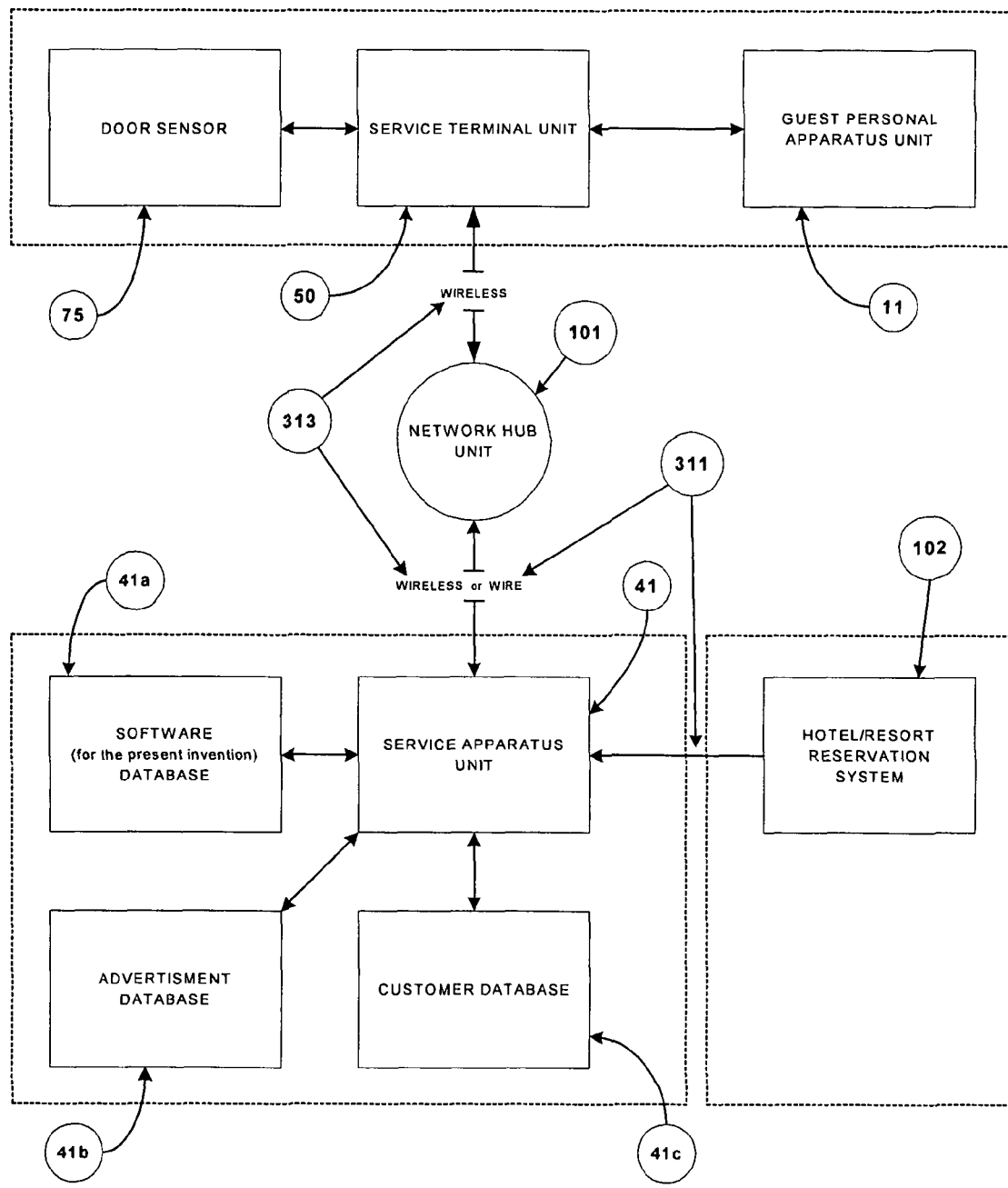
FIG. 6 is a diagram of alternate embodiment of the present invention utilizing Wired/Wireless Network means.

FIG. 6—Preferred Embodiment

In FIG. 6, the service apparatus 41 and terminal unit 50 can transmit and receive signals between the units through a telecommunications network system comprised of wire 311 and wireless 313 data and voice communication channels. The door sensor 75 and ports for an apparatus external to the main system, such as a personal computer or hand computer, are connected to the service terminal 50 using the wire communication channel 311. The software database 41*a*, advertisement database 41*b*, and customer database 41*c* communicate within the service apparatus unit 41. Other apparatus external to the main system, such as a hotel/resort computer 102, is connected to the service apparatus unit 41 using the wire communication channel 311. The communication network includes an intelligent hub unit 101, which is located in the network system between the service apparatus 41 and terminal units 50. A hub unit directs and increases multiple signals concurrently. The network connection between the service apparatus 41 and network hub unit(s) 101 are connected using a wire 311 or wireless 313 communication channel depending on a facility's setup for information technology network communication medium.

What is claimed is:

1. A method for providing a personalized greeting and presentation of services and entertainment to a hotel or resort room guest, the method comprising:
   gathering, a plurality of preference information for the guest before the guest arrival to an assigned hotel or resort room, the gathering comprising:
      ascertaining various businesses for a system;
      inputting the preference information including a guest name;
      displaying a customized system menu for the guest to select;
      pre-selecting preferred services from the customized system menu by the guest;
      storing the personalized greeting and information for the particular guest in a database stored on a service apparatus unit, the service apparatus unit comprising a memory and processor;
      editing the personalized greeting and presentation stored in the database concerning the guest; and
      classifying the greeting and presentation data based on a plurality of categories including greetings, services, biometrics, and entertainment data according to preference information of the guest;
   developing a plurality of recommendations for the guest based on the ascertained businesses and classification;
   generating the greeting and presentation based on the information chosen by the guest and the plurality of recommendations;
   activating a door sensor when a door to the guest's assigned room is opened by the guest for the first time, wherein the door sensor communicates to the service apparatus unit;
   sending the greeting and presentation from the service apparatus unit to a service terminal unit in the guest's assigned room;
   presenting, by the service terminal unit, the generated greeting and presentation, in video graphic form, to the guest in response to the activation of the door sensor; and
   transferring the greeting and presentation to a personal apparatus owned by the guest from the service terminal unit as an option.

2. The method of claim 1, further comprising identifying the database including greetings, services and entertainment chosen by a particular guest.

3. The method of claim 1, further comprising identifying the biometrics database of said guest.

4. The method of claim 1, further comprising selecting said classification from a plurality of factors including a group location of said guest, location of services, geographic location of hotels or resorts, personal tastes of said particular guest, age of said particular guest, gender of said particular guest, dates of services, prices of said services, and types of entertainments.

5. The method of claim 1, wherein the type and format of the services and entertainment are qualified in a current embodied in a computer system configured for network access.

6. The method of claim 1, further comprising producing a data signal, and sending said data signal to a service apparatus unit.

7. The method of claim 1, further displaying a plurality of options for selecting services and entertainment on said service terminal.

8. The method of claim 1, further comprising confirming the selected preferences by at least one of voice, sound, music, or displaying the information.

9. The method of claim 1, further comprising selecting and organizing electronic packages including a personalized greeting and information format based on said preference data of said guest.

10. The method of claim 1, further comprising the personalized greeting and information format including a personalized audio greeting addressing said guest by name, a personalized audio advertisement selected by said guest and a personalized audio message requested by said guest.

11. The method of claim 1, further comprising displaying service and entertainment options available on the service terminal unit for said guest to select.

12. The method of claim 1, comprising verifying the options selected by the guest with an audio confirmation.

* * * * *